(12) United States Patent
Gonzaga et al.

(10) Patent No.: US 10,906,364 B2
(45) Date of Patent: Feb. 2, 2021

(54) MACHINE AND METHOD FOR TREATING A TIRED WHEEL

(71) Applicant: Butler Engineering and Marketing S.p.A., Rolo (IT)

(72) Inventors: Tullio Gonzaga, Correggio (IT); Cristiano Tarozzi, Rio Saliceto (IT)

(73) Assignee: BUTLER ENGINEERING AND MARKETING S.P.A., Rolo (IT)

( * ) Notice: Subject to any disclaimer, the term of this patent is extended or adjusted under 35 U.S.C. 154(b) by 259 days.

(21) Appl. No.: 16/046,107

(22) Filed: Jul. 26, 2018

(65) Prior Publication Data

US 2019/0030968 A1 Jan. 31, 2019

(30) Foreign Application Priority Data

Jul. 27, 2017 (IT) .................. 102017000086220

(51) Int. Cl.
| | |
|---|---|
| *B60C 25/135* | (2006.01) |
| *B60C 25/138* | (2006.01) |
| *B60C 25/05* | (2006.01) |
| *B60C 25/01* | (2006.01) |

(52) U.S. Cl.
CPC .......... *B60C 25/135* (2013.01); *B60C 25/056* (2013.01); *B60C 25/138* (2013.01); *B60C 25/015* (2013.01)

(58) Field of Classification Search
CPC ... B60C 25/135; B60C 25/056; B60C 25/138; B60C 25/015
See application file for complete search history.

(56) References Cited

U.S. PATENT DOCUMENTS

| | | | | |
|---|---|---|---|---|
| 8,342,222 | B2* | 1/2013 | Braghiroli | ........... B60C 25/0554 |
| | | | | 157/1.1 |
| 8,544,520 | B2* | 10/2013 | Sotgiu | ................. B60C 25/0542 |
| | | | | 157/1.17 |
| 8,613,303 | B1 | 12/2013 | Hanneken et al. | |
| 8,770,254 | B1* | 7/2014 | Hanneken | ............. B60C 25/138 |
| | | | | 157/1.17 |
| 8,783,326 | B1* | 7/2014 | Vaninger | ............. B60C 25/0551 |
| | | | | 157/1.17 |
| 8,904,863 | B1* | 12/2014 | Voeller | ................ G01M 17/021 |
| | | | | 73/460 |
| 9,073,394 | B1* | 7/2015 | Clasquin | ................ B60C 25/056 |
| 9,434,219 | B1* | 9/2016 | Clasquin | ............. B60C 25/0548 |
| 9,645,037 | B2* | 5/2017 | Meyer | ..................... G01M 1/00 |
| 9,731,566 | B1* | 8/2017 | Voeller | ................ G01M 17/021 |
| 9,834,046 | B2* | 12/2017 | Nicolini | ................ B60C 25/056 |
| 10,000,101 | B2* | 6/2018 | Corghi | ................ B60C 25/056 |
| 2018/0356784 | A1* | 12/2018 | Sotgiu | ..................... B60C 25/00 |

FOREIGN PATENT DOCUMENTS

| | | |
|---|---|---|
| DE | 4202803 | 7/1993 |
| DE | 4205045 | 8/1993 |
| EP | 1479538 | 11/2004 |
| EP | 3000627 | 6/2013 |

OTHER PUBLICATIONS

Search Report for IT 201700086220 dated Apr. 16, 2018 (8 pages).

* cited by examiner

*Primary Examiner* — David B. Thomas
(74) *Attorney, Agent, or Firm* — Tutunjian & Bitetto, P.C.

(57) ABSTRACT

The present invention concerns a machine for treating a tired wheel, for example a machine for assembly and/or disassembly of a tired wheel, as well as a method for treating a tired wheel, for example an assembly and/or disassembly method.

16 Claims, 3 Drawing Sheets ns to preferred and advanta-
geous embodiments of the invention.

MACHINE AND METHOD FOR TREATING A TIRED WHEEL

TECHNICAL FIELD OF THE INVENTION

The present invention concerns a machine for treating a tired wheel, for example a machine for assembling and/or disassembling a tired wheel, and a method for treating a tired wheel, for example an assembly and/or disassembly method.

STATE OF PRIOR ART

Usually, the assembly and disassembly operations of a tired wheel are performed by means of a machine provided with a rotating table or platform on which the wheel or the rim is blocked, after which, via appropriate bead breaker and disassembly tools, the tire is treated so as to fit or remove it on/from the rim.

During the work phases, forces are applied to the tire at the discretion of the operator, hence it will be understood that is difficult to perform said control without damaging the wheel components and without endangering the safety of the operators, taking account also of the differences that exist between the various types of wheels currently in use.

The European patent EP1479538B1 in the name of the applicant of the present patent application describes a machine for servicing tired wheels which comprises, among the other components, a wheel-holder table as well as bead releasing rollers.

The machine is further provided with an encoder for controlling the angular position of the rotatable table as well as means for evaluating the load applied to it.

Control means are also provided for controlling the position of the working arms as well as of the load applied to them during work on a tired wheel; an automatic handling unit communicating with the sensors and control means is also provided.

However, the machine described in EP1479538B1 is not suitable for making it possible to work a tired wheel in an appropriate manner and safely.

DE4202803C1 and DE4205045C1 describe respective machines for treating tired wheels provided with sensors, but not such as to guarantee the implementation of a reliable automatic or manual operation.

U.S. Pat. No. 8,613,303B1 and EP3000627A1 teach solution according to the state of the prior art.

SUMMARY OF THE INVENTION

One object of the present invention is to provide a new machine for treating tired wheels.

A further object of the present invention is to provide a machine as above indicated for assembling and/or disassembling tired wheels.

A further object of the present invention is to provide a machine for treating tired wheels which is able to automatically perform respective operations without damaging the tire and/or the rim of the wheels.

A further object of the present invention is to provide a machine for treating tired wheels which is able to detect abnormal operating conditions and if necessary to stop the operation of the machine and warn the operators or restore appropriate working conditions.

In accordance with one aspect of the invention, a machine is provided according to the present application.

In accordance with another aspect of the invention, a method is provided according to the present application.

The present application refers to preferred and advantageous embodiments of the invention.

BRIEF DESCRIPTION OF THE DRAWINGS

Further characteristics and advantages of the invention will become clearer from the description of an embodiment example of a machine, illustrated by way of indication in the accompanying drawings in which.

In the accompanying drawings, identical parts or components are identified by the same reference numbers.

DETAILED DESCRIPTION OF THE INVENTION

Figure 1:
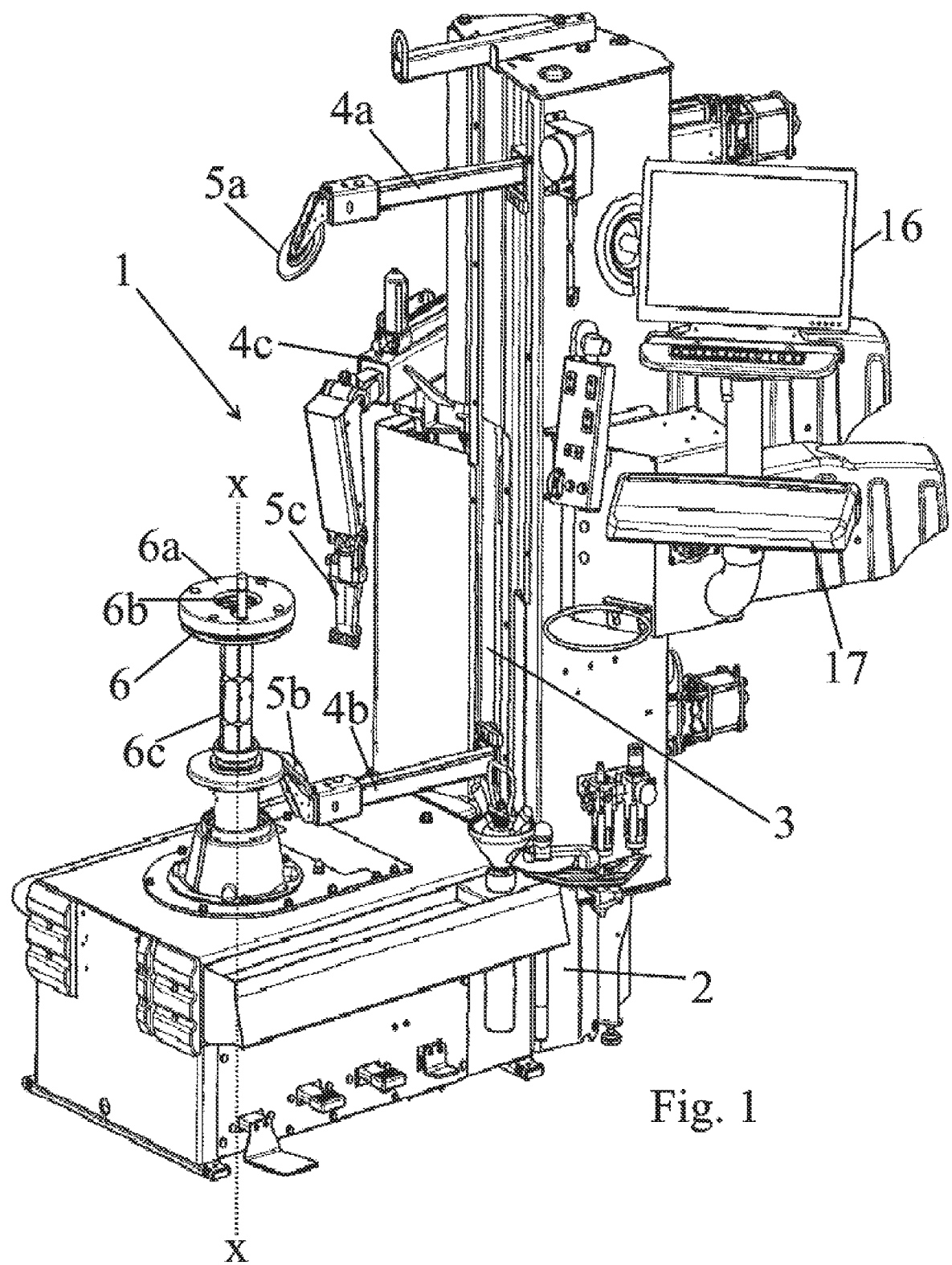
FIG. 1 is a slightly from above perspective view of a machine according to the present invention.
Figure 2:
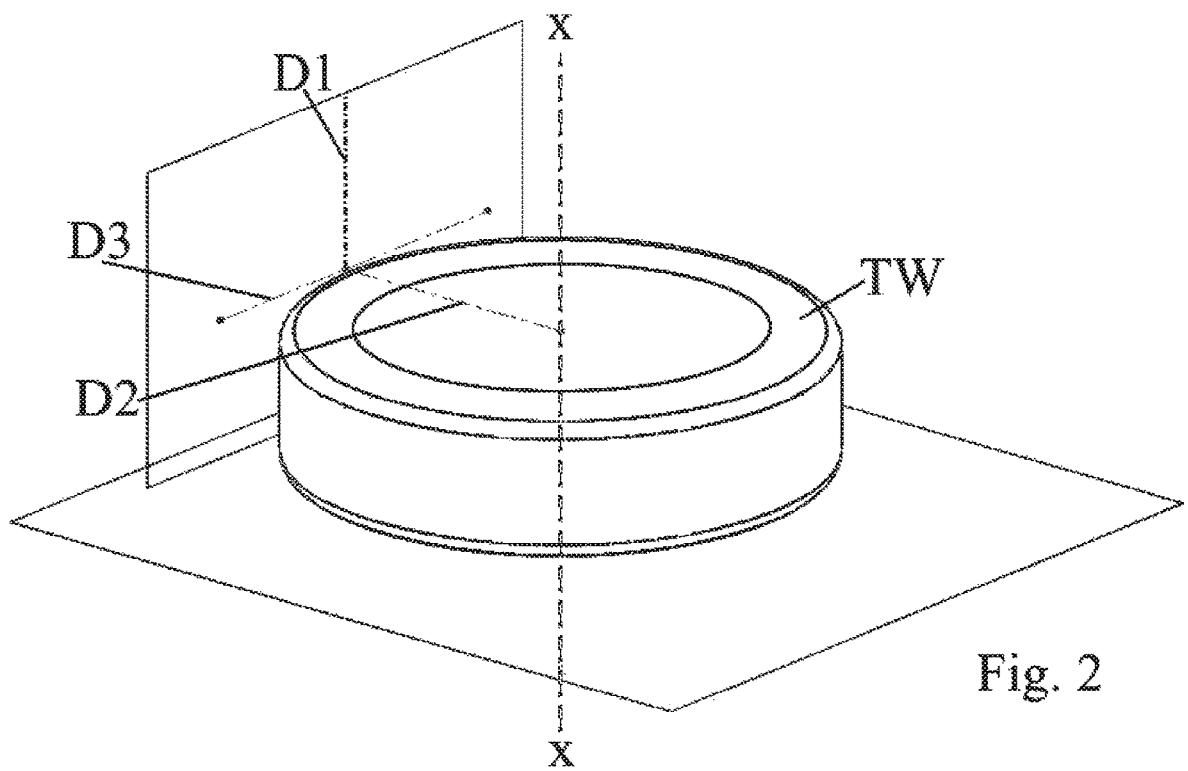
FIG. 2 schematically illustrates a tired wheel with indication of the axes or directions of detection of the forces or loads or resistant forces applied to a or each working tool during treatment of a tired wheel.
Figure 3:
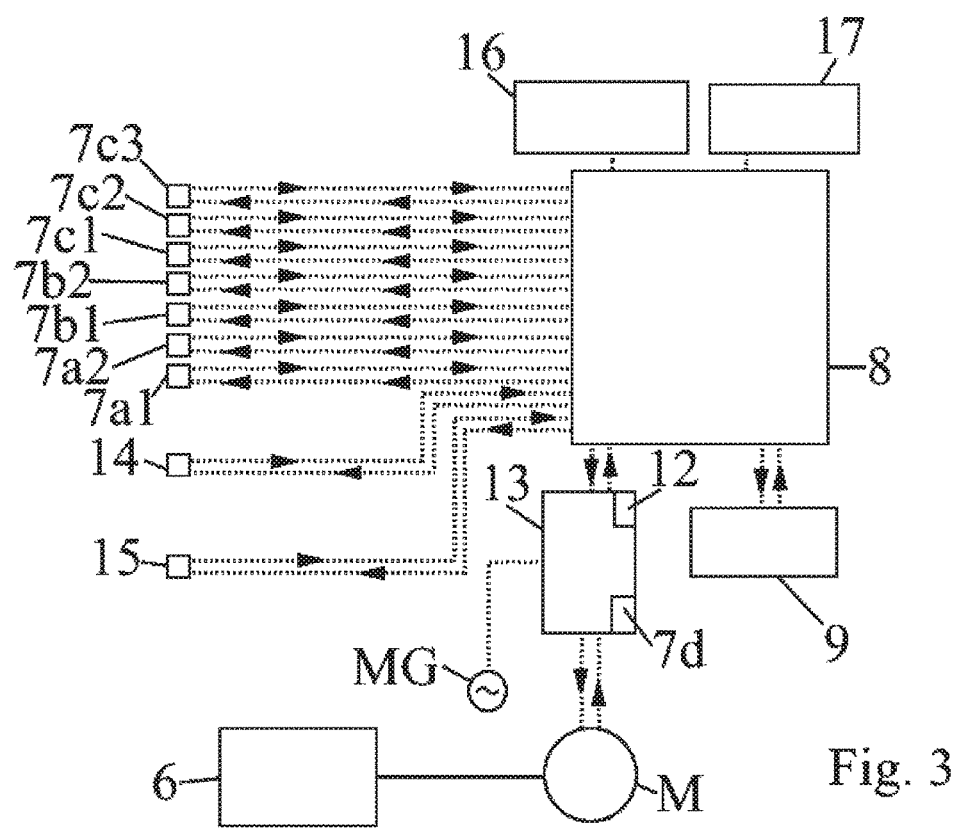
FIG. 3 illustrates a block diagram of the control system in a machine according to the present invention.

With reference to the accompanying figures, a machine 1 is illustrated for treating tired wheels TW comprising a base 2, at least one column 3 protruding upwards from the base 2, at least one tool-holder arm 4a, 4b, 4a supported, for example overhanging from the column or from a column 3 and at least one working tool 5a, 5b, 5c each supported by or articulated to a tool-holder arm 4a, 4b, 4c.

Operating means can be provided, such as hydraulic, pneumatic or electric actuators or actuators of other type, for operating one or more arms 4a, 4b, 4a, to move them along the column or the respective column 3, and actuator means if necessary, such as hydraulic, pneumatic or electric actuators or actuators of other type, for operating one or more working tools 5a, 5b, 5c relative to the respective arm 4a, 4b, 4c.

Clearly, one or more tools (in particular the tools 5a, 5b) can also be pivoted idle to the respective arm 4a, 4b or one or more tools (in particular the tool 5c) can be articulated or pivoted directly or with the interposition of another component to the respective arm 4c, thus being angularly movable as a function of the reaction force imparted to them by a rim and/or tire of a tired wheel during the treatment of the latter, as described for example in EP1714807A1, EP2524821A1 or EP2875969A1.

Pedals or control buttons of the actuators, operating means or motors of the machine components, or alternatively or in addition, remote control of such elements can also be provided.

The machine 1 further comprises support and constraining means 6 supported by the base 2 or by a respective base, which are arranged to support and constrain a rim or a tired wheel TW with axis of rotation and symmetry x-x, preferably, in use, vertical or inclined, for example approximately 10°-40° with respect to the vertical, but also horizontal if desired.

The support and constraining means 6 can comprise a wheel holder table 6a, if desired delimiting an axial hole 6b, for example supported by a respective upright 6c protruding upwards from the base 2. In this case, the support and constraining means 6 can also comprise a centering cone element (not illustrated in the figures) with shaft that can be inserted in the axial opening of a wheel rim mounted on the table 6a and which can be engaged in the axial hole 6b of the latter, thereby clamping the wheel rim and therefore the wheel between cone element and table. Alternatively, the support and constraining means 6 can include a jaw clamping unit.

If desired, the machine comprises motor means M, for example a hydraulic, pneumatic or electric motor, if desired asynchronous, such as a three-phase asynchronous electric motor or a motor of other type, designed or arranged to drag in rotation the support and constraining means 6, so that the latter are rotatable in such a way as to be suitable for dragging in rotation a wheel rim or a tired wheel mounted on them around a rotation axis x-x which, in use, corresponds to the axis of rotation and symmetry x-x of the wheel rim or the tired wheel. The motor means M can be housed in the base 2 or in a base.

Clearly, the machine 1 can also comprise a gearmotor or means for transmitting the movement from the motor means M to the support and constraining means 6 or to the table 6a.

The following are also provided in the machine 1: one or more detection means $7a1$, $7a2$, $7b1$, $7b2$, $7c1$, $7c2$, $7c3$, $7d$ for detecting the stresses or forces or loads applied by the working tool 5a, 5b, 5c and/or the stresses or moments or loads applied by the support and constraining means 6 to the wheel TW or to the components thereof or the resistant or reaction stresses or loads or forces on the working tool 5a, 5b, 5c and/or the resistant or reaction stresses or loads or torques on the support and constraining means 6, which are suitable for detecting the stress or the load or the resistant force to which the tool 5a, 5b, 5c is subjected each time, by the wheel or the components thereof, during the work processes, for example assembly and/or disassembly, and/or the stress or the load or the torsional moment or resistant torque to which the support and constraining means 6 are subjected each time, by the wheel or the components thereof, during the work processes, for example assembly and/or disassembly.

To this regard, the at least one tool can comprise one or more bead breaker rollers 5a, 5b and in such case the detection means can include detection means $7a1$, $7a2$, $7b1$, $7b2$ for detecting the stresses or loads applied by a or by each bead breaker roller 5a, 5b or the resistant force applied to it/them by the wheel TW or by the tire during the treatment (if desired, assembly or disassembly) in a first direction D1 parallel to the axis of rotation x-x and/or in a second direction D2 radial to the axis of rotation x-x, i.e. in the direction from the bead breaker roller 5a or, better, from the tip or portion thereof acting on the wheel TW or on the tire or on the rim thereof to the axis of rotation x-x.

According to the non-limiting embodiment example illustrated in the figures, two bead breaker rollers are provided, one upper 5a arranged to act from the top towards the bottom so as to bead break a first upper, in use, circumferential bead of a tire, and one lower 5b arranged to act from the bottom towards the top to bead break a second lower, in use, circumferential bead of a tire.

In this case, the upper bead breaker roller 5a can be provided with a detection means $7a1$ for detecting the stresses or loads applied by such bead breaker roller 5a or the resistant force applied to it by the wheel TW or by the tire during treatment in a first direction D1 parallel to the axis of rotation x-x and/or a second detection means $7a2$ for detecting the stresses or loads applied or resistant force in a second direction D2 radial to the axis of rotation x-x, while the lower bead breaker roller 5b can be provided with a detection means $7b1$ for detecting the stresses or loads applied by such bead breaker roller 5b or the resistant force applied to it by the wheel TW or by the tire during treatment in a first direction D1 parallel to the axis of rotation x-x and/or a second detection means $7b2$ for detecting the stresses or loads applied or resistant force in a second direction D2 radial to the axis of rotation x-x.

The machine can comprise, alternatively or in addition to the above, at least one assembly and/or disassembly tool 5c of a tired wheel and in this case the detection means can comprise detection means $7c1$, $7c2$, $7c3$ for detecting the stress or load applied by the assembly and/or disassembly tool 5c and/or the stress or load or resistant force applied to it by the wheel TW or by the tire during the treatment (if desired, assembly or disassembly) in a first direction D1 parallel to the axis of rotation x-x, in a second direction D2 radial to the axis of rotation x-x or, better, from the tip of portion of the tool acting on the wheel TW or on the tire or on the wheel rim thereof to the axis of rotation x-x, and/or in a third direction D3 orthogonal to the first and to the second direction and which, in use, is tangential to the portion of circumferential bead of the tire or wheel rim on which the tool 5c is operating.

In this case, the tool 5c can be provided with a detection means $7c1$ for detecting the stress or load applied by the assembly and/or disassembly tool 5c and/or the stress or load or resistant force applied to it by the wheel TW or by the tire during treatment in a first direction D1 parallel to the axis of rotation x-x and/or a second detection means $7c2$ for detecting the stress or loads applied or resistant forces in a second direction D2 radial to the axis of rotation x-x, and/or a third detection means $7c3$ for detecting the stresses or loads applied or resistant forces in a third direction D3 as above indicated. Alternatively, a detection means can be provided for detecting the stresses or loads applied or resistant forces in several directions.

Substantially, the detection means for detecting the stresses or loads or resistant forces can comprise, for example, load cells or other detection means, each designed to detect the force applied or the resistant force in one or more directions D1, D2, D3 of detection of the stresses or forces applied or resistant forces. As is known, a load cell is usually an electronic component, for example a transducer, which is used to measure a force applied on an object by measuring an electric signal that varies due to the deformation produced by such force on the component.

Moreover, the detection means $7a1$, $7a2$, $7b1$, $7b2$, $7c1$, $7c2$, $7c3$ can be constrained close to the tools 5a, 5b, 5c, for example in purposely provided cavities or zones in the respective arms 4a, 4b, 4c or support brackets or sections.

The detection means $7a1$, $7a2$, $7b1$, $7b2$, $7c1$, $7c2$, $7c3$ are in communication, in particular in electric or electronic communication, by means of cables or other transmission systems with a control unit 8, described in further detail below, in order to send to the latter the data or signals obtained by them. Specific supply means for supplying the detection means can then be provided, or the supply is provided by the control unit 8.

If the machine 1 comprises motor means M designed to rotationally drive the support and constraining means 6, it can also comprise a detector for detecting the angular position of the support and constraining means 6, such as an encoder 12 or an angular position transducer, and/or a detection means, such as a sensor component 7*d* arranged to detect the torque applied by the motor means M or the resistant torque on the motor means M or the current absorbed by the motor means M.

The sensor component 7*d*, if provided and if arranged to detect the current absorbed by the motor means M, cooperates or in any case detects data or values of the same forces or loads or stresses which are evaluated or detected by the third detection means 7*c*3, although the values detected by the latter could be more reliable, taking account of the fact that between sensor component 7*d* and motor means M a gearmotor and other intermediate components could be provided.

Both the detector 12 and the sensor component 7*d* are in communication, in particular in electric or electronic communication, with a control unit 8, which will be described in further detail below, in order to send to the latter the data or signals obtained from them.

Alternatively or in addition, detectors could be provided for detecting the angular position of the tools 5*a*, 5*b*, 5*c*, if the latter are angularly displaced or rotated with respect to the wheel during the treatment.

If desired, an inverter 13 can also be provided to vary the supply frequency of the motor means M, thereby increasing or decreasing the characteristic curve of the latter as a function of the variation of the resistant torque applied to them or in the current absorbed by the same. The inverter 13 can intercept the current supply from the mains or from a generator MG to the motor.

Substantially, the CPU establishes the desired rotation speed or the desired operating conditions for the support and constraining means 6 and consequently sets the inverter 13 or consequently dialogues with a microprocessor of the inverter, so that the inverter, if necessary, varies the frequency of the power supply voltage of the motor M, so as to vary the characteristic curve of the motor M and therefore the torque-rotation speed ratio, thereby adapting the latter to the operating conditions that occur each time.

The sensor component 7*d* and/or the detector 12 can be integrated in the inverter 13, if said component is provided.

The sensor component 7*d* and/or the detector 12 can be constrained or fixed integral with the support and constraining means 6 or with the base thereof.

As will be understood, the detection means 7*a*1, 7*a*2, 7*b*1, 7*b*2, 7*c*1, 7*c*2, 7*c*3, 7*d* detect the forces or loads or torques directly, or also indirectly, as can occur in the case in which the sensor component detects the current absorbed by the motor means M, on the basis of which it is possible to evaluate the resistant torque, or also in the case of load cells that measure an electric signal which varies due to the deformation imposed on a component.

The machine 1 or the CPU 8 is provided with an appropriate memory portion in which a database 9 is stored or can be stored containing data relative to the stresses or forces or torques or also the diagrams of stress or forces or torques applicable to a tired wheel TW or, better, to a specific wheel or to a specific type of wheel, for the treatment thereof, such as assembly or disassembly, and/or data relative to the stresses or resistant forces or resistant torques or also the diagrams of stress or resistant forces or resistant torques applicable from a tired wheel or, better, from a specific wheel or from a specific type of wheel, for example from the tire and/or the rim thereof, to the tool 5*a*, 5*b*, 5*c* and/or to the support and constraining means 6 during the treatment, such as the assembly or disassembly of a tired wheel.

Of course, the data contained in the database 9 are divided according to the type or types of tired wheel TW to be treated, since each wheel or, better, the components thereof have their own specific hardness or resistance.

More specifically, the database 9 can contain diagrams or data of values of stresses or forces or torques applicable to a tired wheel, to the tool or to a tool 5*a*, 5*b*, 5*c* and/or to the support and constraining means 6 related to or depending on the angle or entity of rotation imposed on the wheel or a rim thereof during the treatment, for example during assembly and/or during disassembly or related to or depending on the angle of rotation imposed on the tools around the axis of rotation x-x and to the support and constraining means or along and in contact with the circumferential area of contact between wheel rim and tire of a tired wheel during the treatment.

As regards the assembly of a tired wheel, said diagrams or data refer in particular to the assembly phase that entails the insertion by one or more tools of a first or second circumferential bead of the tire into the channel of the rim delimited between two edges thereof.

With reference to the disassembly of a tired wheel, such diagrams or data refer in particular to the disassembly phase which entails the extraction by one or more tools of a first or second circumferential bead of the tire from the channel of the wheel rim delimited between two edges thereof.

The detection means 7*a*1, 7*a*2, 7*b*1, 7*b*2, 7*c*1, 7*c*2, 7*c*3, 7*d* detect instead values of stresses or forces or torques applied to a tired wheel TW, to the tool 5*a*, 5*b*, 5*c* and/or to the support and constraining means 6 correlated with or as a function of the angle or entity of rotation imposed on the wheel TW during the treatment, or related to or depending on the angle of rotation imposed on the tool 5*a*, 5*b*, 5*c* around the axis of rotation x-x and to the support and constraining means or along and in contact with the circumferential area of contact between wheel rim and tire of a tired wheel during the treatment.

More specifically, the data or diagrams contained in the database 9 are reference values corresponding to optimal or safe operating conditions of the machine or such not to result in failures or damage for a tired wheel TW and/or for the tool e 5*a*, 5*b*, 5*c* and/or for the support and constraining means 6.

With regard to this aspect, as it is known, to treat, for example assemble, disassemble or bead break a tired wheel, the tool or tools necessary to perform such operation are caused to engage with the tire and/or rim, in particular with a portion of a circumferential bead thereof and therefore a rotation of the support and constraining means 6 is controlled by approximately 300°-360° or a rotation of the tool or tools along and in contact with the circumferential area of contact between rim and tire of a tired wheel mounted on the support and constraining means is controlled by approximately 300°-360°.

The applicant of the present patent application has ascertained that to correctly service a tired wheel TW, for example assemble and/or disassemble with particular reference to the phases of assembly (insertion of a tire bead into the rim channel) and disassembly (extraction of a tire bead from the rim channel) described above, it is necessary to apply by means of the tools 5*a*, 5*b*, 5*c* a given force depending on the angle of rotation of the support and constraining means 6 or of the tool or tools around the latter or as described above; this means that the force applied by the tools must vary according to the entity of the rotation imposed by the support and constraining means 6 on the wheel or tool or tools 5a, 5b, 5c along and in contact with the above-mentioned circumferential area.

This clearly means that the resistant force applied by the wheel TW or, rather, by the tire thereof on the tools 5a, 5b, 5c must appropriately vary during the treatment, while the rotation of the support and constraining means 6 is controlled or the rotation of the tools around the same is controlled.

If the support and constraining means 6 are rotated by means of appropriate motor means M, the force or load applied by the tools 5a, 5b, 5c to the wheel TW, and also the resistant force applied by the latter to the deformation by the tools 5a, 5b, 5c, is reflected on the support and constraining means 6 opposing the rotation thereof, which causes a variation in the torsional moment or resistant torque applied by the wheel to the support and constraining means 6.

In view of the above, it can be understood that also the torsional moment or the resistant torque applied by the wheel TW to the support and constraining means 6 must appropriately vary during the treatment, while the rotation of the support and constraining means 6 is controlled, depending on the angle or entity of rotation imparted to the latter.

With reference to said aspect, as will be described also further on, during optimal or correct disassembly without damage of a tired wheel, with particular reference to the phase entailing extraction by one or more tools of a circumferential bead of the tire from the channel of the rim delimited between two circumferential edges thereof, the applicant of the present patent application has ascertained that the stress or resistant torque or moment or torsional moment on the support and constraining means 6 has a greater initial value which decreases to a minimum when the support and constraining means have undergone a rotation of approximately 180°, while in the case of an optional or correct assembly without damage, with particular reference to the phase entailing the insertion by one or more tools of a circumferential bead of the tire into the channel of the rim delimited between two edges thereof, the stress or resistant torque or moment or torsional moment on the support and constraining means 6 has a minimum initial value which increases until the support and constraining means have undergone a rotation of approximately 270°, then decreasing again to minimum values.

This applies substantially without distinction to all types of wheels and tires, with stress or resistant torque or moment or torsional moment values clearly variable from one type of wheel to another.

In a machine according to the present invention, as already partly indicated, a CPU or an electronic control unit 8 is also provided in communication, for example electrical or electronic, with the database 9 and with the detection means 7a1, 7a2, 7b1, 7b2, 7c1, 7c2, 7c3, 7d and/or with the angular position detector 12 or with an angular position detector of the tools, so that it receives, in a substantially continuous manner, i.e. with a detection period chosen for example in a range of between one tenth of a second and a second, stresses or forces or torques detected by one or more of the detection means 7a1, 7a2, 7b1, 7b2, 7c1, 7c2, 7c3, 7d as well as, if provided, by the angular position detector 12 or by an angular position detector of the tools (if these are made to rotate around the support and constraining means) and, after any processing of the data received, for example to correlate the forces or torques of the detection means 7a1, 7a2, 7b1, 7b2, 7c1, 7c2, 7c3, 7d with the data of the angular position detector, compare them with the data contained in the database 9, so that according to the result of the comparison made, the unit 8 can consequently drive the working tool 5a, 5b, 5c and/or the support and constraining means 6, or provide information on the movements to impart to the working tool 5a, 5b, 5c and/or to the support and constraining means 6 during the treatment, or stop the machine and therefore the treatment, if desired the assembly and disassembly, and issue warning messages or notify the operator of the problem or anomaly or not appropriate operation and any measures to overcome the problem or anomaly or to restore a correct operation.

The electronic control unit 8 can therefore be adapted to drive the working tools 5a, 5b, 5c and/or the support and constraining means 6 during the treatment.

The database 9 can be a local database and associated solely with the machine 1 or it can be a database shared by several machines or equipment and communicating with the control unit 8 by means of cables, internet, USB, Wi-Fi or similar means.

A local database 9 can also be provided for each machine, and also a database shared and communicating with the local databases.

The database 9 or the shared database can be arranged after any tests that may be necessary on a large number of wheels or in any case on the types of wheels to be treated with machines according to the present invention and if necessary updated whenever treatment is carried out with the data obtained during the latter.

The machine further comprises means for acquisition or insertion or detection of the type of wheel to be treated.

If desired, the machine 1 can comprise a detector of pressure sensors or TPMS 14 applied on the inside of a tired wheel and/or of microchips applied to the tire and/or of a barcode reader 15 or in general of sensors able to detect the type of wheel mounted on the support and constraining means 6, so that the machine 1 is able to automatically identify the type of wheel to be treated, for example when the same is arranged and clamped on the support and constraining means 6.

The control unit 8 can comprise emitters and detectors of radio signals. In said regard, the TPMS is activated by radio signals and once activated, it transmits a signal relative to the pressure of the wheel.

The machine 1 can also be provided with sensor means for detecting the position of one or more tools 5a, 5b or 5c and/or means for measuring the movement or advancement speed of a tool 5a, 5b or 5c during the treatment.

The position sensors can comprise for example encoders, linear or rotary, and by combining the values detected by the same with a clock, chronometer or similar means, it is possible to detect the speed of the respective component.

Clearly, the machine 1 can also comprise a display 16 connected, in particular electrically or electronically connected, to the electronic control unit 8, which display 16 provides the operators with a visual interface of the unit 8, by means of which the operators can display and if necessary set said unit.

As a means for entering data or settings in the unit or in the database 9, a keypad 17 can be provided and, if desired, also a mouse connected to the control unit 8 to assist the operators during setting or inspection thereof. If desired, said entry means could also comprise a tablet or a smartphone or a touch screen display or similar means or means for acquisition of voice messages.

The display 16 and/or the keypad 17 can for example be mounted or supported by the column or by a column 3.

Substantially, for the treatment, for example assembly and disassembly of a tired wheel, first a tired wheel or the rim of or for a tired wheel is fixed on the support and constraining means 6, then one or more tools 5a, 5b, 5c are positioned next to a circumferential bead of a tire to be assembled or disassembled on a wheel rim and the tool or the tools are properly controlled so as to engage a respective portion of the bead.

Before or during said phases, the type of wheel to be treated is acquired or entered or detected.

At this point, the motor M is operated, so that it rotates the support and constraining means 6, for example a wheel-holder table, or the tools 5a, 5b, 5c are rotated around the means 6 and every variation or increase or decrease in the resistant torque or stress applied to the support and constraining means 6 and/or every variation or increase or decrease in the resistant force or in the stress applied by the tools 5a, 5b, 5c is detected by the detection means 7a1, 7a2, 7b1, 7b2, 7c1, 7c2, 7c3, which communicate it to the CPU.

The CPU receives said data input, in particular in combination with the data relative to the angle of rotation of the support and constraining means 6 or of the tools 5a, 5b, 5c around them, and compares said data for the specific wheel or specific type of wheel treated with those stored for such specific type of wheel in the database 9 and on the basis of the result of this comparison assesses whether the treatment, for example assembly or disassembly, is being performed correctly and therefore without the risk of damaging the components of the wheel or whether such risk exists, in which case the CPU stops the machine and warns the operator or can consequently drive the tools and/or the support and constraining means 6 in such a way as to bring the forces or torques applied to the wheel back within the ranges of normal values, according to what is stored in the database 9.

As already partly indicated, the CPU receives the data from the detection means, detectors and/or sensors in a substantially continuous manner, thus carrying out the above-mentioned comparison in real time in order to identify in time if the treatment is not correct and is damaging the wheel, for example.

In this regard, each tire, according to its hardness, tolerates certain forces or stresses and the same applies, albeit with less rigidity than the tires, to each wheel rim, therefore for each tired wheel or, better, for the components, tire and/or rim thereof, there are values or diagrams of forces or torques applicable to them, in particular according to the width of the angular area treated, which with tool/s fixed and assigned to work a specific area of the wheel is related to the rotation of the support and constraining means 6, whereas with tool/s moving around the support and constraining means 6, depends on the angle of rotation of the tool/s. Control of the stresses or resistant forces or resistant torques applied to the tools is provided in particular by a detection means for detecting the stresses or load cell designed to detect the stress in the direction D3, which is tangential to the wheel or to the portion of wheel during the treatment thereof.

If, on the other hand, control of the stresses or resistant forces applied to the tools is provided by a detection means for detecting the stresses or a load cell arranged to detect the stress in the direction D1 and/or D2, these detections take account of the fact that the axial or radial thrust or action on the tire of a tired wheel must not exceed a certain value or that in any case it must not exceed it for longer than a given period. If this occurs, the CPU on the basis of comparison of the data received from the respective detection means slows down the advancement speed of the tool or tools 5a, 5b, 5c and/or varies the advancement path thereof, for example acting on a proportional valve of the actuators of the tools or of the supporting arms thereof, in particular of the tool or tools related to the detection means which have detected values outside the control ranges or ranges stored in the database.

A treatment method for example for assembly and/or disassembly and/or bead breaking of a tired wheel with a machine according to the present invention, substantially comprises the following steps:

- locking a rim or a tired wheel on the support and constraining means 6,
- detecting or entering the identification data of the tired wheel TW to be treated or of the rim and tire for the same, for example by entry means,
- determining or selecting the treatment to be performed, for example assembly, disassembly and/or bead breaking, for example by entry means,
- based on the identification data of the tired wheel TW, accordingly setting the position, displacement and, if desired, the speed of the machine components for the determined or selected treatment; this can be done by the operator or automatically by the unit 8,
- performing the treatment; also this step can be done by the operator or automatically by the unit 8.

Moreover, during performance of the treatment and in particular while the tools 5a, 5b, 5c act on the wheel and on the components, tire and/or wheel rim of the wheel, in particular during the stage involving the extraction, by one or more tools, of a circumferential bead of the tire from the rim channel delimited between two edges thereof, the electronic control unit 8 receives, substantially in a continuous manner, if desired every period of time between a tenth of a second and a second, data on the stresses or loads or applied or resistant forces or torques detected by the detection means 7a1, 7a2, 7b1, 7b1, 7c1, 7c2, 7c3, 7d and, if desired, by the other detector means and compares them with the data contained in the database 9, in order, in particular if as a result of the comparison it is detected that the treatment has not been performed correctly and there is the risk of damaging the tire or rim or the machine components, to stop the machine if an anomaly occurs or drive accordingly the tool 5a, 5b, 5c and/or the support and constraining means 6 or provide information on the movements to be imposed on the at least one working tool during the treatment.

If the treatment is performed automatically, i.e. not making an operator to carry out step by step, but only the initial settings, for example, or if the treatment is conducted manually step by step by an operator or if the treatment is conducted with combinations of automatic and manual steps, the tensions to which in particular the bead of the tire treated and/or the rim are subjected are controlled by the settings contained in the database, monitoring the values obtained by the detection means, in such a way as to check that all the parameters are observed, always remaining within the prescribed tolerances until completion of the operation. If this does not occur, the unit 8 can stop the machine or modify the settings or movements of the machine components.

If the control unit 8 identifies an incorrect treatment sequence, as indicated above, it can stop the machine and, if desired, notify the operator of the anomaly by means of a dialogue box, for example illustrated on the display 16, suggesting a remedy in order to continue, for example vary the position, the movement and/or the speed of the tool or tools or of the support and constraining means 6.

Figure 4:
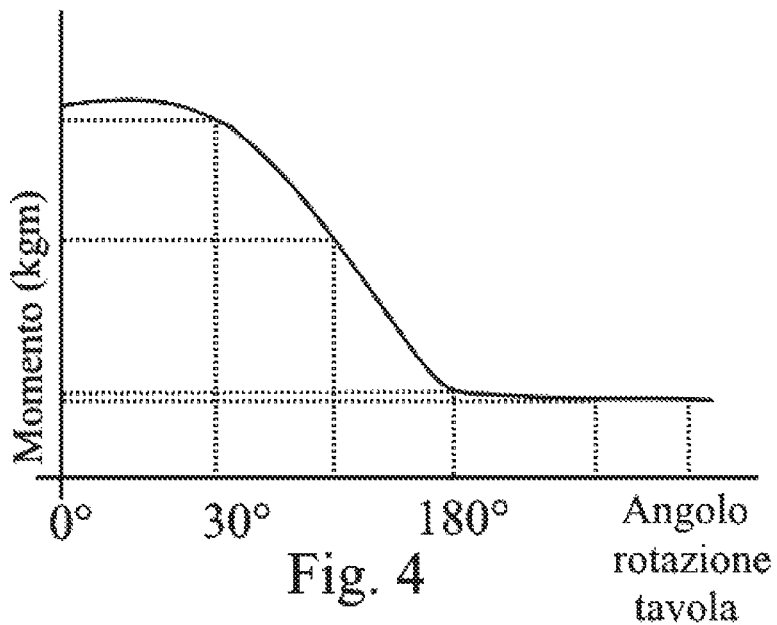
FIG. 4 shows the trend of the resisting moment or torque applied to means for supporting and constraining of a machine according to the present invention by a wheel mounted on said means during disassembly of the latter as a function of the angle of rotation imparted to the support and constraining means.

With particular reference to a disassembly method according to the present invention or, better, to a phase thereof for extraction of a first or second circumferential bead of a tire from the rim channel defined between the circumferential or annular edges of the latter, in particular conducted with a machine according to the present invention and provided with motor means designed to drag in rotation the support and constraining means, with an angular position detector 12 and a sensor component 7d, then the control unit monitors the signals emitted by the sensor component 7d according to the data detected by the detector 12 to check that, during the phase entailing the extraction by one or more tools of a circumferential bead of the tire from the rim channel delimited between two edges thereof, the stress or resistant torque has a greater initial value which decreases to a minimum when the support and constraining means 6 have undergone a rotation between approximately 150° and approximately 200°, for example between approximately 170° and approximately 190°, preferably approximately 180° (see in particular FIG. 4). If this does not occur, the control unit 8 stops the machine and issues a warning message.

Alternatively, the control unit varies the action of the tool 5a, 5b, 5c and/or of the support and constraining means 6 so as to vary the action of the same and therefore bringing the stress or resistant torque values, depending in particular on the angle of rotation of the support and constraining means 6 or of the tools, back within the operating ranges stored in the database for disassembling a wheel such as the one currently being treated.

If desired, alternatively or in addition to that above indicated, during a disassembly method according to the present invention, the control unit 8 monitors the signals emitted by an angular position detector of a tool 5a, 5b, 5c to check that the stress or load detected by the detection means 7c3 in a third direction D3 has a greater initial value which decreases to a minimum when the tool 5a, 5b, 5c has undergone a rotation between approximately 150° and approximately 200°, and if this does not occur, it proceeds as indicated above.

In a disassembly method, after mounting the wheel on the support and constraining means and having arranged the tool 5c and, if desired, the tools 5a and 5b in the outer circumferential area of a tired wheel, the tool 5c is moved so that it is inserted between tire and rim, for as long as the disassembly tool 5c grips a portion of the first bead of the tire by one of its free ends.

Subsequently, the tool is moved backwards with the gripped portion of the first bead beyond the respective first edge of the wheel rim or externally to the area or channel between first and second edge of the wheel rim.

At this point, the support and constraining means 6 are put into rotation, thus putting into rotation the tired wheel or the tool 5c, so as to complete disassembly of the first bead of the tire.

In this case, the first bead initially strongly opposes the movement by the tool or tools, but after that a part thereof has been moved outside the area between the edges of the rim and when the wheel has been rotated by an angle of approximately 150°-200°, for example 170-190°, preferably 180°, the part of the bead still between the edges of the rim does not strongly resist the action of the tool, and, on the contrary, it comes out almost autonomously, so that the stress applied to the support and constraining means 6 and also to the tool 5c must decrease. If this does not occur, it means that the disassembly has not been performed correctly or that something is preventing correct disassembly, with the risk of damaging the tire or the rim.

The second bead of the tire can be disassembled or brought out of the channel of a rim in a similar manner to the first bead or in another way or manually.

Figure 5:
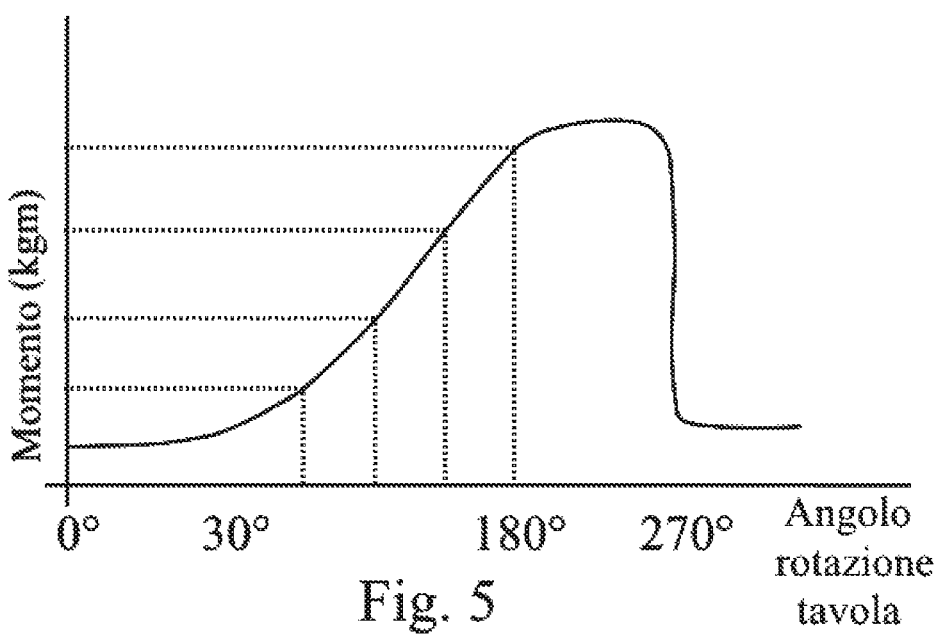
FIG. 5 shows the trend of the resisting moment or torque applied to means for supporting and constraining a machine according to the present invention by a wheel mounted on said means during assembly of the latter as a function of the angle of rotation imparted to the support and constraining means.

With reference to an assembly method according to the present invention, in particular conducted with a machine according to the present invention and provided with motor means M designed to drag in rotation the support and constraining means 6, with an angular position detector 12 and sensor component 7d, then the control unit 8 monitors the signals emitted by the sensor component 7d depending on the data detected by the detector 12 to check that, during the phase entailing insertion by one or more tools of a circumferential bead of the tire into the rim channel delimited between two annular or circumferential edges thereof, the stress or resistant torque has an initial minimum value that increases, in particular proportionally, until the support and constraining means have undergone a rotation around the axis of rotation x-x between approximately 230° and approximately 300°, for example between approximately 250° and approximately 280°, preferably approximately 270°, then decreasing again to minimum values (see in particular FIG. 5). If this does not occur, the control unit stops the machine and emits a warning message.

If desired, alternatively or in addition to the above procedure during an assembly method according to the present invention, the control unit 8 monitors the signals emitted by an angular position detector of a tool 5a, 5b, 5c to check that the stress or the load detected by the detection means 7c3 in a third direction D3 has a minimum initial value that increases until the tool 5a, 5b, 5c has undergone a rotation around the axis of rotation x-x between approximately 230° and approximately 300° and if this does not occur, it proceeds as indicated above.

Alternatively, the control unit varies the action of the tool 5a, 5b and/or 5c or of the support and constraining means 6 thus bringing the stress or resistant torque values back within the operation ranges stored in the database for the disassembly of a wheel such as the one currently being treated.

With reference to an assembly method, the main stress increases slowly up to a rotation of 230°-300°, for example approximately 250°-280, preferably approximately 270°, of the support and constraining means 6 and then decreases, so that if the values detected by the detection means do not reflect said trend of the resistant torques or forces, it means that the assembly has not been performed correctly, at least so far, and the CPU stops the machine in order not to damage the tire and/or rim; if desired, it varies the speed and/or position and/or advancement path of the tools to correctly perform the assembly.

In this regard, an assembly method of a tired wheel entails first mounting the rim on the support and constraining means and then passing, also manually if desired, a first circumferential bead of the tire into the rim channel.

At this point, the tool 5c and, if desired, the tools 5a and 5b are arranged at the outer circumferential area of a tired wheel, and the tool 5c is moved so as to drag a portion of the tire into the channel defined between the edges of the rim.

Subsequently, the support and constraining means 6 and/or the tool 5c are rotated, thus completing assembly also of the second bead of the tire, after which the tool 5c is extracted.

As will be understood, with a machine and a method according to the present invention, tired wheels can be treated without damaging the tire and/or the rim of the wheels and abnormal operating conditions can be detected, if necessary stopping operation of the machine or varying the settings thereof.

This is not guaranteed by the machines proposed so far.

For example, the machine described by EP1479538B1 does not teach a database in which data or diagrams of stress or resistant loads are stored, therefore the wheel components are not protected from any damage during work.

Modifications to and variations of the invention are possible within the protective scope defined by the claims.

The invention claimed is:

1. A machine for treating a tired wheel comprising
at least one base,
at least one column protruding upwards from said base,
at least one tool-holder arm supported by said at least one column,
at least one working tool supported by or pivoted to said at least one tool-holder arm,
support and constraining means supported by said at least one base for supporting and constraining a wheel rim of or for a tired wheel, said support and constraining means being adapted to support a wheel rim or a tired wheel with an axis of rotation and symmetry which is vertical, horizontal or inclined with respect to the vertical,
one or more detection means for detecting at least one of the loads or forces applied by said at least one working tool to a wheel on the support and constraining means or to the components of the wheel, the moment or torque applied by said support and constraining means to a wheel on the support and constraining means or to the components of the wheel, and one or more detection means for detecting at least one of the loads or resisting or reaction forces on said at least one working tool and/or of resisting or reaction moments or torques on said support and constraining means,
at least one database containing at least one of data relating to forces or torques or even diagrams of forces or torques which may be applied during the treatment to a tired wheel and data relating to resisting forces or torques or even diagrams of resisting forces or torques which may be applied during the treatment from a tired wheel to at least one of said at least one tool and to said support and constraining means,
at least one electronic control unit in communication with said at least one database as well as with said detection means, so that said at least one electronic control unit is arranged to receive forces or torques detected by said detection means and to compare them with the data stored in said database so that, according to the result of the performed comparison, it is able to drive at least one of said at least one working tool and said support and constraining means, or to provide information relating the movements to be imposed to at least one of said at least one working tool and to said support and constraining means during treatment, or to stop the machine and, accordingly, the treatment, and possibly outputting warning messages in case of malfunctioning,
wherein said at least one database contains diagrams or data relating to force or torque values applicable to a tired wheel, to at least one of said at least one tool and to said support and constraining means, related to or depending on the rotation angle or rotation amount imposed on the wheel during the treatment, or related to or depending on the rotation angle imposed to said at least one tool around the support and constraining means or along and in contact with the circumferential contact area between the wheel rim and the tire of a tired wheel during the treatment, and
wherein said detection means detect force or torque values applied to a tired wheel, to at least one of said at least one tool and to said support and constraining means, related to or depending on the rotation angle or rotation amount imposed to the wheel during the treatment, or related to or depending on the rotation angle imposed to said at least one tool around the support and constraining means or along and in contact with the circumferential contact area between the wheel rim and the tire of a tired wheel during the treatment.

2. The machine according to claim 1, wherein the data or diagrams stored in said database are reference values corresponding to safe operation conditions of said machine or operation conditions not causing failures or damages to at least one of a tired wheel, to said at least one tool and to said support and constraining means.

3. The machine according to claim 1, wherein said at least one tool comprises at least one of at least one bead breaker roller and at least one assembly or disassembly tool and wherein said detection means comprise detection means of forces or loads applied to at least one of said at least one bead breaker roller and to at least one assembly or disassembly tool, or of the resisting force applied to at least one of said at least one bead breaker roller and said at least one assembly or disassembly tool by the wheel during the treatment in at least one of a first direction parallel to the axis of rotation and in a second direction radial to the axis of rotation.

4. The machine according to claim 1, wherein said at least one tool comprises at least one of at least one assembly and disassembly tool of a tired wheel, and wherein said detection means comprise detection means of the force or load applied by the assembly and disassembly tool or the resisting force applied to it by the wheel during the treatment, in a third direction orthogonal to a first direction parallel to the axis of rotation and to a second direction radial to the axis of rotation.

5. The machine according to claim 1, wherein said detection means comprise at least one load cell suitable for detecting the applied or resisting force in one or more directions of detection.

6. The machine according to claim 1, comprising motor means adapted to drag in rotation said support and constraining means so that the latter are rotatable in such a way as to be able to drag in rotation a wheel rim or a tired wheel mounted on said support and constraining means about an axis of rotation which, in use, corresponds to the axis of rotation and symmetry of the wheel rim or of the tired wheel and wherein said machine comprises an angular position detector of said support and constraining means, said angular position detector being in communication with said control unit so as to send to the latter the data or signals obtained therefrom.

7. The machine according to claim 1, comprising motor means adapted to drag in rotation said support and constraining means so that the latter are rotatable in such a way as to be able to drag in rotation a wheel rim or a tired wheel mounted on said support and constraining means about an axis of rotation which, in use, corresponds to the axis of rotation and symmetry of the wheel rim or of the tired wheel and wherein said detection means comprise a sensor component adapted to detect the torque applied by the motor means or the resisting torque on the motor means or the current absorbed by the motor means.

8. The machine according to claim 6, comprising an inverter adapted to vary the supply frequency of the motor means so as to increase or decrease the characteristic curve of the latter according to the resisting torque variation applied thereto or to the variation of the current absorbed by the same.

9. The machine according to claim 7, comprising an inverter adapted to vary the supply frequency of the motor means so as to increase or decrease the characteristic curve of the latter according to the resisting torque variation applied thereto or to the variation of the current absorbed by the same.

10. The machine according to claim 1, comprising sensor means of the position of said at least one tool.

11. The machine according to claim 1, comprising measurement means of the movement or advancement speed of said at least one tool during the treatment.

12. The machine according to claim 1, comprising a machine for assembling and disassembling a tired wheel.

13. The machine according to claim 1, comprising means for acquisition or insertion or detection of the type of wheel to be treated.

14. A method for treating, such as assembling and disassembling, a tired wheel, comprising the following steps:
  arranging a machine for treating a tired wheel comprising
    at least one base,
    at least one column protruding upwards from said base,
    at least one tool-holder arm supported by said at least one column,
    at least one working tool supported by or pivoted to said at least one tool-holder arm,
    support and constraining means supported by said at least one base for supporting and constraining a wheel rim of or for a tired wheel, said support and constraining means being adapted to support a wheel rim or a tired wheel with an axis of rotation and symmetry which is vertical, horizontal or inclined with respect to the vertical,
    one or more detection means for detecting at least one of the loads or forces applied by said at least one working tool to a wheel on the support and constraining means or to the components of the wheel, the moment or torque applied by said support and constraining means to a wheel on the support and constraining means or to the components of the wheel, and one or more detection means for detecting at least one of the loads or resisting or reaction forces on said at least one working tool and of resisting or reaction moments or torques on said support and constraining means,
    at least one database containing at least one of data relating to forces or torques or even diagrams of forces or torques which may be applied during the treatment to a tired wheel and data relating to resisting forces or torques or even diagrams of resisting forces or torques which may be applied during the treatment from a tired wheel to at least one of said at least one tool and to said support and constraining means,
    at least one electronic control unit in communication with said at least one database as well as with said detection means, so that said at least one electronic control unit is arranged to receive forces or torques detected by said detection means and to compare them with the data stored in said database so that, according to the result of the performed comparison, it is able to drive at least one of said at least one working tool and said support and constraining means, or to provide information relating the movements to be imposed to at least one of said at least one working tool and to said support and constraining means during treatment, or to stop the machine and, accordingly, the treatment, and possibly outputting warning messages in case of malfunctioning,
  wherein said at least one database contains diagrams or data relating to force or torque values applicable to a tired wheel, to said at least one tool and to said support and constraining means, related to or depending on the rotation angle or rotation amount imposed on the wheel during the treatment, or related to or depending on the rotation angle imposed to said at least one tool around the support and constraining means or along and in contact with the circumferential contact area between the wheel rim and the tire of a tired wheel during the treatment, and
  wherein said detection means detect force or torque values applied to a tired wheel, to said at least one tool and to said support and constraining means, related to or depending on the rotation angle or rotation amount imposed to the wheel during the treatment, or related to or depending on the rotation angle imposed to said at least one tool around the support and constraining means or along and in contact with the circumferential contact area between the wheel rim and the tire of a tired wheel during the treatment,
  locking a wheel rim or a tired wheel on the support and constraining means,
  detecting or entering the identification data of said tired wheel to be treated,
  determining or selecting the treatment to be performed,
  based on the identification data of the tired wheel, accordingly setting the position, the displacement and, if desired, the speed of the machine components for the determined or selected treatment,
  performing the treatment,
  wherein, while performing the treatment, the electronic control unit receives data of said applied forces or torques, or resisting forces or resisting torques detected by said detection means and compares them to the data stored in said database so as to stop the machine if an anomaly occurs or to drive accordingly at least one of said at least one tool and said support and constraining means or to provide information relating to the movements to be imposed to at least one of said at least one tool and to said support and constraining means during the treatment.

15. The method according to claim 14, comprising a method for disassembling, wherein the control unit monitors the signals emitted by at least one of a detector of the angular position of said support and constraining means and by a detector of the angular position of said at least one tool to check if,
  during the step involving the extraction by one or more tools of a circumferential bead of the tire from the wheel rim channel delimited between two edges of the same wheel rim, at least one of the stress or load detected by the detection means in a third direction tangential to the circumferential bead portion of the tire or wheel rim on which the tool is operating and the torque applied by the motor means or the resisting torque on the motor means or the current absorbed by the motor means detected by the detection means has a higher initial value which decreases to a minimum when at least one of the support and constraining means and said at least one tool have undergone a rotation in a range from about 150° to about 200° about said axis of rotation, wherein if this does not occur, the control unit stops the machine and outputs a warning message or varies the action of at least one of said at least one tool and of the support and constraining means so as to restore the stress, load, or torque values measured by said detection means back to the operating ranges stored in the database for disassembling a wheel comprising the one currently being treated.

16. The method according to claim 14, comprising a method for assembling, wherein the control unit monitors the signals emitted by at least one of a detector of the angular position of said support and constraining means and by a detector of the angular position of said at least one tool to check if, during the step involving the insertion by one or more tools of a circumferential bead of the tire into the wheel rim channel delimited between two edges of the same wheel rim, at least one of the stress or load detected by the detection means in a third direction tangential to the circumferential bead portion of the tire or wheel rim on which the tool is operating and the torque applied by the motor means or the resisting torque on the motor means or the current absorbed by the motor means detected by the detection means has a lower initial value which increases until at least one of the support and constraining means and said at least one tool have undergone a rotation in a range from about 230° to about 300° about said axis of rotation and then decrease again, and if this does not occur, the control unit stops the machine and possibly outputs a warning message or varies the action of at least one of said at least one tool and of the support and constraining means so as to restore the stress, load, or torque values back to the operation ranges stored in the database for assembling a wheel such as the one currently being treated.

* * * * *